United States Patent [19]

Modell et al.

[11] 4,113,446
[45] Sep. 12, 1978

[54] GASIFICATION PROCESS

[75] Inventors: Michael Modell, Cambridge; Robert C. Reid, Lexington, both of Mass.; Sanjay I. Amin, Kalamazoo, Mich.

[73] Assignee: Massachusetts Institute of Technology, Cambridge, Mass.

[21] Appl. No.: 742,712

[22] Filed: Nov. 17, 1976

Related U.S. Application Data

[63] Continuation-in-part of Ser. No. 598,102, Jul. 22, 1975, abandoned.

[51] Int. Cl.² .............................................. C10J 3/16
[52] U.S. Cl. ...................................... 48/202; 48/206; 48/209; 252/373
[58] Field of Search .................... 48/202, 206, 214 A, 48/214 R, 209, 204, 197 R, DIG. 7; 252/373; 423/650

[56] References Cited

U.S. PATENT DOCUMENTS

| | | | |
|---|---|---|---|
| 3,148,227 | 9/1964 | Hearon et al. | 48/209 |
| 3,715,195 | 2/1973 | Tassoney et al. | 48/197 R |
| 3,890,113 | 6/1975 | Child et al. | 48/214 R |
| 3,919,114 | 11/1975 | Reynolds | 252/373 |
| 3,926,583 | 12/1975 | Rostrup-Nielsen | 48/214 A |
| 3,929,431 | 12/1975 | Koh et al. | 48/214 A |

Primary Examiner—Robert L. Lindsay, Jr.
Assistant Examiner—George C. Yeung
Attorney, Agent, or Firm—Arthur A. Smith, Jr.; Paul J. Cook

[57] ABSTRACT

Solid or liquid organic materials are converted to high BTU gas with little or no undesirable char formation by reaction with water at or above the critical temperature of water and at or above the critical pressure of water to achieve the critical density of water. The reaction can be conducted either in the presence or in the absence of a catalyst.

10 Claims, No Drawings

GASIFICATION PROCESS

This invention was made in the course of work performed under a grant from the National Aeronautics and Space Administration.

This application is a continuation-in-part of application Ser. No. 598,102, filed July 22, 1975 now abandoned.

BACKGROUND OF THE INVENTION

This invention relates to a process for converting solid or liquid organic material to gas having a high heating value.

At the present time, there are available processes for converting solid or liquid organic material to high BTU gas such as methane. However, most of the commercially available processes require a two step procedure which in turn requires high heat input to obtain the desired results. For example, in the wellknown steam-iron process, steam is contacted with iron in a first step to produce hydrogen and to oxidize the iron to FeO. When the reaction is conducted in the presence of organic material, and the appropriate conditions of temperature and pressure are maintained, some hydrogen reacts with carbon to form primarily methane containing minor concentrations of other organic gases. The oxidized iron then is transferred to a second step wherein it is heated under reducing conditions to form iron which subsequently is recycled to the initial iron oxidation step. The process is undesirable since it requires expensive material handling equipment to permit recycling iron and iron oxide between the oxidation and reducing steps. Furthermore, the process has a high heat requirement to effect the endothermic oxidation reaction. Although most of the heat can be recovered from the endothermic reduction step, the heat is low temperature heat which is not useful in providing the temperature requirements of the oxidation step.

It has also been proposed to form high BTU gases such as synthesis gas ($H_2$ + CO) or methane by the catalytic reaction of superheated steam with low molecular weight hydrocarbons. However, when higher molecular weight hydrocarbons are employed as feeds, excessive undesirable coke formation occurs which deactivates the catalysts employed. By proper choice of catalysts, steam to hydrocarbon ratios, temperatures and pressures, it is presently commercially attractive to employ hydrocarbons having a molecular weight as high as naphtha or desulfurized light petroleum distillates as an organic feed without experiencing excessive coke formation.

It would be highly desirable to provide a process for forming high BTU gas from high molecular weight organic materials, including solids, such as organic waste material or coal to provide good conversions to high BTU gas. Furthermore, it would be desirable to provide such a process which gives little or no conversion to waste solid organic material such as char or coke. In addition, it would be desirable to provide such a process which permits the conversion to high BTU gas relatively quickly so that the need for either large reactors or long residence times in the reactor is not required so that commercially attractive throughput rates can be obtained.

SUMMARY OF THE INVENTION

This invention is based upon the discovery that liquid or solid organic materials can be converted to high BTU gas with little or no formation of undesirable char or coke when the organic material is reacted with water at a temperature at or above the critical temperature of water and at or above the critical pressure of water to achieve the critical density of water. It has been found that the desired conversion to high BTU gas can be attained either in the absence of catalysts or in the presence of a catalyst which promotes hydrogenation, reforming and cracking of the organic material.

DETAILED DESCRIPTION OF THE INVENTION

In accordance with this invention, it has been found that unexpectedly high conversion to high BTU gas compositions from organic materials, without accompanying formation of undesired char or coke can be attained when reacting the organic material with water at a temperature and pressure equal to or more severe than the critical condition for water. It has been found that when operating the reaction below the critical temperature and/or the critical pressure of water, excessive conversion to char or coke with accompanying reduction in conversion to gas is effected. It has also been found in the conversion of certain liquid or solid organic materials that, as the reaction temperature approaches the critical temperature of water, the conversion to char or coke is undesirably increased. However, when the reaction is conducted at a severity greater than the critical temperature and pressure of water, there is a startling reduction or elimination of char or coke reaction products and an unexpected increase of conversion to high BTU gas.

The critical conditions for water are 647° K and 218 atmospheres. Thus, the reaction of the invention must be conducted at this temperature and water pressure or greater temperatures and water pressures. In accordance with this invention, the carbon from the organic material reacts with water to form synthesis gas (CO + $H_2$) in a first step which then reacts to form methane and carbon dioxide. The relative concentrations of each of these gases are dictated by the reaction rates and thermal equilibria in effect in the reaction system as defined by the particular temperatures, pressures, catalyst system and time of reactions employed. Thus, depending upon the particular conditions employed, including the source of organic material, the gas product will contain different concentrations of carbon monoxide, methane, hydrogen, carbon dioxide and other low molecular weight hydrocarbon gases such as ethane and ethylene. In any event, it is desirable to minimize carbon dioxide formation while maximizing hydrogen, methane and carbon monoxide formation in order to increase the BTU value of the gas produced. Regardless of these conditions, the char or coke formation will be minimized or eliminated when operating at or above the critical conditions for water.

The reaction is effected by intimately contacting the organic material with water. When employing a solid organic material such as coal or organic waste material, it is preferred that the solid be in the form of small particles and that the reaction be conducted so that the organic particles and water are formed and maintained as a slurry. In order to promote intimate contact, the solid particles should be small, in the order of from submicron size to about 1 mm. Large size particles can be employed but the probability of forming char is thereby increased. Any organic solid material can be employed herein such as garbage, paper, sawdust or other waste material, cellulose, waxes, coal, shale or the like. Obviously, any liquid organic material also can be employed including aryl or acyl hydrocarbons such as petroleum fractions up to and including asphalt fractions, aromatic hydrocarbons, sugars, organic acids, alcohols, aldehydes, ketones, amines, mixtures thereof and the like.

Under the conditions set forth herein, the endothermic reforming reaction:

$$C + H_2O \rightarrow CO + H_2$$

and the exothermic reaction:

$$CO + 3H_2 \rightarrow CH_4 + H_2O$$

occur concomitantly in the same reaction. This is extremely advantageous since the heat provided by the exothermic reaction is used to provide the endothermic reaction so that very little heat need be added to the process from external sources.

The weight ratio of organic material to water is maintained so that there is sufficient hydrogen available from the water to promote reforming and is sufficient to prevent or minimize formation of dehydrogenated char or coke.

Generally, the organic material will comprise from about 1 to about 20 weight percent of the water, more usually between about 5 and 10 weight percent of the water. Higher weight ratios of organic material can be employed when the organic material is more fully hydrogenated.

The catalysts that can be employed in this process are those known to promote hydrogenation and can be employed alone or with catalysts known to promote steam reforming or cracking. Representative suitable catalysts include nickel, molybdenum, cobalt, their oxides or sulfides, and noble metal catalysts such as platinum, palladium or the like or mixtures thereof either unsupported or supported on a base such as silica, alumina mixtures thereof and the like. It is preferred to conduct the reaction in the presence of a hydrogenation catalyst since increased conversion to high BTU gas is obtained thereby.

As stated above, the reaction temperature should be at least the critical temperature of water, 647° K and at least the critical pressure of water, 218 atmospheres to achieve the critical density of water. Higher temperatures and higher pressures further promote reaction and the upper limit of temperatures and pressure employed herein is dictated by process economics and the stability of the apparatus employed. It is believed that under those conditions, more intimate contact of the organic molecules with water occurs rather than the adjacent organic molecules thereby promoting thermal cracking and reforming while preventing char formation by polymerization.

The process can be carried out as either a batch process or as a continuous process. In the continuous process, a reaction slurry or liquid mixture of the reactant or both is fed to the reactor under heat and pressure and the product gas is drawn off continuously under high pressure. It is desirable to conduct the reaction so that product carbon dioxide is minimized and product synthesis gas or methane are maximized. The carbon dioxide can be removed from the product gas by any conventional means known in the art.

The following examples illustrate the present invention and are not intended to limit the same.

EXAMPLE I

This example illustrates the greatly improved results obtained when conducting the reaction of glucose and water at or above the critical conditions of water as compared to results obtained when conducting the reaction below the critical conditions of water. This experiment is significant since the conversion of glucose has been shown to be a very close approximation of the results that can be expected with cellulose.

The results set forth below were obtained from a number of different runs in the same apparatus. A standard 1-1, 316 stainless-steel, Autoclave Engineers Model AB-1005 magnetically stirred autoclave was used as the reactor. The autoclave was electrically heated by a controlled furnace. The autoclave was charged with water (and catalyst) and heated to desired operating temperature. The reactor vapor space was vented at 423 K to remove air through a port. The pressure in the reactor then correspond to the vapor pressure of water (usually within ±3 percent). A concentrated solution of glucose (~ 35 percent) was then injected rapidly into the reactor by a high pressure pump.

Liquid and vapor samples were taken at various intervals of time (5, 20, 60, and 120 min.) through sample ports. The gas samples were analyzed for CO, $CO_2$, $CH_4$, $H_2$, $CH_3OH$ by a Beckman GC-5, gas chromatograph and the liquid samples for their organic carbon content, total oxygen demand (TOD), and glucose content (using an o-toluidine spectro-photometric technique). Preliminary studies on the liquid samples also were made on a gas chromatography-mass spectrometry system.

Reaction, in each case, was conducted in the presence of a catalyst, the compositions of which are identified in Table III. The results obtained at conditions less than the critical conditions of water are set forth in Table I. The results obtained at the critical conditions of water are set forth in Table II.

TABLE I:

| | | | | | | | | | |
|---|---|---|---|---|---|---|---|---|---|
| RESULTS BELOW CRITICAL CONDITIONS | | | | | | | | | |
| Reaction time: 2 hours | | | | PRODUCTS | | | | | |
| | | | | | Vapor | | | | |
| RUN N°. | Temperature (° K) | Pressure (ATM) | Carbon in Glucose Initially (g) | % Original Carbon in Glucose | Liquid | Condensible g Carbon | Volatile* | Solid | Carbon Closure % |
| 1 | 423 | 5.1 | 3.36 | 64.88 | 0.85 | 0.003 | 0.0001 | Trace | 89 |
| 2 | 423 | 5.0 | 3.36 | 67.56 | 0.63 | 0.001 | 0.001 | Trace | 86 |
| 3 | 473 | 13.6 | 3.36 | 20.56 | 1.63 | 0.008 | 0.001 | 1.0 | 96 |
| 4(c) | 473 | 13.6 | 3.36 | 26.49 | 1.18 | — | — | — | — |
| 5(c) | 523 | 40 | 4.0 | 0.8 | 2.97 | 0.011 | 0.006 | — | — |
| 6(c) | 573 | 83 | 3.36 | 2.08 | 1.59 | 0.033 | 0.01 | 0.95 | 80 |
| 7 | 573 | 83 | 3.36 | 1.18 | 1.14 | 0.03 | 0.01 | 1.31 | 95 |

TABLE I:-continued
RESULTS BELOW CRITICAL CONDITIONS

Reaction time: 2 hours

| RUN N°. | Temperature (°K) | Pressure (ATM) | Carbon in Glucose Initially (g) | % Original Carbon in Glucose | Liquid | Condensible Carbon | Volatile* | Solid | Carbon Closure % |
|---|---|---|---|---|---|---|---|---|---|
| | | | | | | Vapor | | | |
| 8 | 623 | 165 | 4.0 | 1.0 | — | — | — | 0.44 | — |

C denotes catalyst (3g, C11-2S-04)
RUN 8 for one hour only.
*$H_2$, CO, $CO_2$, $CH_3OH$ identified. No details given because of insignificant gasification.

TABLE II:
RESULTS AT CRITICAL CONDITIONS

| RUN N°. | Temperature (°K) | Pressure (ATM) | Carbon in Glucose Initially (g) | Fluid | Volatile | Solid | Carbon Closure | % C as Volatile Gas | $H_2$ | $CH_4$ | $CO_2$ | CO | $C_2+$ |
|---|---|---|---|---|---|---|---|---|---|---|---|---|---|
| 9(c)* | 647 | 218 | 4 | 3.47 | 0.4 | — | 97 | 10 | 30 | 1.5 | 42 | 27 | — |
| 10 | 647 | 218 | 4 | 3.11 | 0.33 | — | 86 | 8 | 25.8 | 1.3 | 34.4 | 38.5 | — |
| 11(c)** | 647 | 218 | 4 | 2.60 | 0.81 | — | 86 | 20 | 45.1 | 3.2 | 38.5 | 12.5 | 0.7 |
| 12(c)** | 647 | 218 | 4 | 2.83 | 0.93 | — | 94.1 | 23.3 | 43.13 | 2.9 | 40.6 | 12.6 | 0.75 |
| 12A(c)** | 647 | 150 | 4 | 1.11 | 0.14 | 2.75 | — | 3.4 | 23.21 | 0.5 | 65.1 | 11.24 | — |

C denotes catalyst run
RUNS 9 and 10 for one hour, RUNS 11, 12 and 12A for 30 minutes
*Catalyst: 39 C11-2S-04 (25% Ni); 2.4 g recovered at end of run.
**Catalyst 14g: 2 g at 7 different catalysts, 5 Ni reforming; 1 Pt on $Al_2O_3$; 1 Co/Mo. set for in Table I 13 g recovered at end of run.

TABLE III:
CATALYST COMPOSITIONS

| Commercial Name | G-90B Nickel Reforming | G-91B Nickel Reforming | 22-6HA Primary Reforming | 11-3 Methanation | C11-25-04 Steam-HC Reforming | HDS-2A Aero | Pt. on Alumina |
|---|---|---|---|---|---|---|---|
| Manufacturer | Chemetron Corp., Catalysts Div., Louisville, Kentucky | | Katalco Corporation, Chicago, Illinois | | Catalysts and Chemicals Inc., Louisville, Kentucky | American Cyanamid Co., Bound Brook, N.J. | Mathey Bishop Inc., Pennsylvania |
| Composition (%) | | | | | | | |
| Ni | 11 | 11 | 27–28 | 16–20 | 25 ± 2 | | |
| $Al_2O_3$ | 72 | 72 | balance∼50 | balance∼65 | 61–66 | 81.28 (alumina base) | Rest alumina |
| CaO | 7.6 | 7.6 | 15–18 | 12–14 | 7–7.5 | | |
| MgO | 0.12 | 0.12 | <0.2 | 2–3 | | | |
| $SiO_2$ | 0.2 | 0.2 (m) | <0.2 | <0.3 | <0.2 (m) | 0.1 0.3 as Fe | Pt=0.61 |
| C (Graphite) | | | 4 | | | | |
| K | | 1.0 | | | | 0.02 | |
| CoO | | | | | | 3.2 | |
| $MoO_3$ | | | | | | 15.1 | |
| SHAPE | Raschig Rings | Tablets | Raschig Rings | Tablets | Raschig Rings | Extruded Pellets | Powder |
| SIZE | ⅜" × ⅜" | ½" × ½" | ⅜" × ⅜" × ¼" | 5.4 mm × 3.6 mm | ⅜ × ⅜" | | |
| Area ($m^2$/gm) | 18 | 18 | 50–60 | 50–70 | 58 | 270 | 1.22 |
| Size used in Study (MESH) | 80/100 | 65/80 | 65/100 | 65/100 | 60/65 | 65/80 | −200 |

As shown from the results in Tables I and II, greatly improved production of high BTU gas is obtained when conducting the reaction at the critical conditions for water as compared to operating below the critical conditions of water. As shown in the tables, the amount of solids formed increased with temperature but then decreased at 623° K.

The carbon balances closed to within 20 percent. The error in closing the balance could be attributed to the difficulty in removal and recovery of all of the solid products from the reactor. From the results, it can be seen that about 35 percent of the glucose is degraded in two hours at 423 K and that practically all the glucose is decomposed in two hours at 573 K. About 40 percent of the carbon charged at 473 K results in a solid product. The amount of carbon in the vapor increased with temperature. However, this gas-phase carbon only accounts for about 1.5 percent of the total carbon at 573 K. Gasification in the form of volatile products even at 573 K is extremely low (∼ 0.3 percent or original carbon).

The experiment was repeated with the glucose water feed without a catalyst both at subcritical conditions and at the critical condition of water. At the subcritical conditions, the quantity of gas formation was insignificant. Furthermore, when the reaction was repeated with glucose at 647° K and at 150 atmospheres, i.e., below the critical pressure, a significant amount of char was obtained. This latter result shows that both the critical pressure and temperature must be maintained in order to avoid significant char production. The most interesting part of the results from Table II is that no "visible" char was found at the end of the 60-min. run, both with and without the catalyst. The carbon material balance closed to within 14 percent.

Considerably more gasification is noted when operating at the critical than at the lower temperature. Comparing runs 9 and 10, the specific catalyst tested in run 9 does not either significantly alter the amount of carbon in the volatile gas nor change the percent methane in the gas. However, from the percent $H_2CO$ and $CO_2$, it appears that the catalyst may be affecting the water gas shift reaction. In run 11, the amount of carbon obtained as a volatile vapor increased to 3 percent. Run 12 was a replication of run 11.

In runs 9 and 10, the reactor was cooled by "blowdown". It was found that all the water and organics could be vented from the reactor. In run 11, the reactor was cooled by cold water passed through a cooling coil. The liquid remaining in the reactor had a pH of 4.9. GC/MS analysis of the liquid in run 11 and vapors in 9 and 10 showed that more than 40 percent of the organics were present as furans or oxygenated furan (furfurals) derivatives. In run 12A, the conditions were identical to run 12 except that the pressure was reduced to 150 atm, which is below the critical pressure and, thus, the density was below the critical density. Considerable amounts of char, similar to that found in sub-critical temperature experiments, were formed. Thus, it is essential to maintain the system at or above both the critical temperature and critical pressure.

EXAMPLE 2

This example illustrates that the results obtained with glucose also are obtained when employing other organic feed materials in that high BTU gas without significant char production is obtained. The reaction, in each case was conducted employing the apparatus described in Example 1 and were conducted at 647° K and 218 atmospheres. The solid materials employed as organic feeds were in the form of finely divided solids. The results are set forth in Table IV.

EXAMPLE 3

This Example illustrates the use of the process for converting coal.

Employing the apparatus described in Example 1, a slurry of bituminous coal (170-200 Tyler mesh) containing 4.95% sulfur was employed as a feed. The feed comprised 16.5 grams coal in 95 cc water which was charged to the preheated reaction containing 270 cc water. Reaction pressure was 3300 psig. Reaction was continued for 60 minutes.

Conversion to gas was 8% and to liquid was 20% with little or no formation of char.

The composition of the gas is set forth in Table V.

TABLE V

|  | Vol % |
|---|---|
| $H_2$ | 12 |
| CO | 30 |
| $CH_4$ | 10 |
| $CO_2$ | 37 |
| $C_2H_4$ | 1 |
| $C_2H_6$ | 2 |
| $H_2S$ | 8 |

In addition, about 80% of the sulfur in the coal feed was precipitated in the water as elemental sulfur or $H_2S$.

We claim:
1. The process for forming a gas composition having a high heating value which comprises reacting a liquid or solid organic material with water wherein the water is at least at its critical temperature and wherein the water pressure is at least at its critical pressure such as to achieve the critical density of water and recovering a gas product from the reaction without significant char formation.

2. The process of claim 1 wherein the reaction is conducted in the presence of a catalyst which promotes hydrogenation.

3. The process of claim 1 wherein the organic mate-

TABLE IV.

RESULTS AT CRITICAL CONDITIONS (647K; 218ATM.)

| Run # | Catalyst | Reaction Time (Mins) | Carbon Initially In (g) | % Carbon Fluid | % Carbon Volatile | % Carbon Solid | Carbon Closure % | Gas Composition (Mole % Dry) | | | | |
|---|---|---|---|---|---|---|---|---|---|---|---|---|
| | | | | | | | | $H_2$ | $CH_4$ | $CO_2$ | CO | $C_2+$ |
| Cellulose 13 | M | 30 | 1.42 | 77.47 | 18.31 | — | 95.7 | 14.5 | 1.5 | 19.7 | 64.2 | 0.13 |
| Hexanoic acid 14 | M | 30 | 5.75 | 82.63 | 2.8 | — | 85.4 | 67.61 | 0.8 | 31.6 | ≦5.0 | — |
| Polyethylene 15 | M | 30 | 3.22 | 25.62 | 2.30 | 62.42 | 90.3 | 26.6 | 2.54 | 65.87 | ≦5.0 | — |
| 16 | M | 180 | 3.22 | 27.02 | 4.01 | 62.73 | 93.7 | 35.75 | 3.73 | 54.43 | ≦5.0 | 1.2 |
| Unea 17 | M | 30 | 0.9 Nitrogen Balance | 77.77 | 11.11 | — | 88.8 | — | — | 100 | — | — |
| | | | 2.1 | 95.24 | — | — | 95.2 | — | — | — | — | — | a: by difference
*: operating pressure was 150 atm.
M: Catalyst mix described in Example 1
Ni: C11-2S-04 nickel catalyst
Carbon Closure: (Carbon in products)/ (original carbon)

As shown in Table IV, the conversion of cellulose was comparable to the good results obtained with the conversion of glucose. In the case of polyethylene, relatively low conversion to gas was obtained. However, the polyethylene was not converted to char but is transformed slowly to a liquid and a gas. The results obtained with hexanoic acid and urea also showed significant gas formation without char formation.

rial is coal particles.

4. The process of claim 2 wherein the organic material is coal particles.

5. The process of claim 1 wherein the organic material comprises a cellulose-containing solid.

6. The process of claim 2 wherein the organic material comprises a cellulose-containing solid.

7. The process of claim 1 wherein organic material is reacted with water and product gas is recovered continuously.

8. The process of claim 2 wherein organic material is reacted with water and product gas is recovered continuously.

9. The process of claim 1 wherein the reaction is conducted in the presence of a catalyst composition which promotes hydrogenation, reforming and cracking.

10. The process of claim 3 wherein the reaction is conducted in the presence of a catalyst composition which promotes hydrogenation, reforming and cracking.

* * * * *